United States Patent
Kim et al.

(10) Patent No.: US 12,327,850 B2
(45) Date of Patent: Jun. 10, 2025

(54) BATTERY MODULE AND BATTERY PACK INCLUDING THE SAME

(71) Applicant: LG Energy Solution, Ltd., Seoul (KR)

(72) Inventors: Donghyun Kim, Daejeon (KR); HyunChan Kim, Daejeon (KR); Jeonghoon Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 513 days.

(21) Appl. No.: 17/771,616

(22) PCT Filed: Jan. 11, 2021

(86) PCT No.: PCT/KR2021/000350
§ 371 (c)(1),
(2) Date: Apr. 25, 2022

(87) PCT Pub. No.: WO2021/145626
PCT Pub. Date: Jul. 22, 2021

(65) Prior Publication Data
US 2022/0407139 A1    Dec. 22, 2022

(30) Foreign Application Priority Data
Jan. 16, 2020   (KR) .................. 10-2020-0006113

(51) Int. Cl.
*H01M 10/653*     (2014.01)
*H01M 10/647*     (2014.01)
(Continued)

(52) U.S. Cl.
CPC ....... *H01M 10/653* (2015.04); *H01M 10/647* (2015.04); *H01M 10/6551* (2015.04);
(Continued)

(58) Field of Classification Search
None
See application file for complete search history.

(56) References Cited

U.S. PATENT DOCUMENTS 9,236,585 B2 *  1/2016  Nishikawa ........ H01M 10/6555
11,476,512 B2 * 10/2022  Choi ................... H01M 10/647
(Continued)

FOREIGN PATENT DOCUMENTS

CN   102856516 A   1/2013
CN   203367390 U  12/2013
(Continued)

OTHER PUBLICATIONS

Extended European Search Report for Application No. 21742006.6 dated Oct. 28, 2022. 10 pgs.
(Continued)

*Primary Examiner* — Kevin M Bernatz
(74) *Attorney, Agent, or Firm* — Lerner David LLP

(57) ABSTRACT

A battery module according to an embodiment of the present disclosure includes: a battery cell stack in which a plurality of battery cells are stacked; a module frame for housing the battery cell stack; and a first thermal conductive resin layer located between the battery cell stack and the bottom portion of the module frame, wherein the bottom portion includes a first region, a second region and a third region, the third region is located between the first region and the second region, which are separated from each other, a first thermal conductive resin layer is formed on the first region and the second region, and at least one through hole is formed in the third region.

12 Claims, 8 Drawing Sheets

(51) Int. Cl.
  *H01M 10/6551* (2014.01)
  *H01M 50/209* (2021.01)
  *H01M 50/227* (2021.01)
  *H01M 50/231* (2021.01)

(52) U.S. Cl.
  CPC ....... *H01M 50/209* (2021.01); *H01M 50/227* (2021.01); *H01M 50/231* (2021.01); *H01M 2220/20* (2013.01)

(56) References Cited

U.S. PATENT DOCUMENTS

| | | | |
|---|---|---|---|
| 11,594,776 B2* | 2/2023 | Yoo | H01M 10/625 |
| 11,652,248 B2* | 5/2023 | Cho | H01M 50/293 |
| | | | 429/99 |
| 12,230,819 B2* | 2/2025 | Lee | H01M 10/0481 |
| 2003/0175584 A1* | 9/2003 | Shrim | H01M 50/256 |
| | | | 429/513 |
| 2013/0004822 A1 | 1/2013 | Hashimoto et al. | |
| 2017/0117517 A1* | 4/2017 | Smith | H01M 50/227 |
| 2018/0083286 A1* | 3/2018 | Ise | H01M 4/667 |
| 2018/0183117 A1* | 6/2018 | Cho | H01M 50/211 |
| 2018/0331336 A1 | 11/2018 | Choi et al. | |
| 2018/0366794 A1 | 12/2018 | Kim et al. | |
| 2019/0131596 A1 | 5/2019 | Yang et al. | |
| 2019/0157729 A1 | 5/2019 | Yamashita | |
| 2019/0198952 A1 | 6/2019 | Choi et al. | |
| 2020/0185797 A1 | 6/2020 | Park et al. | |
| 2020/0313253 A1 | 10/2020 | Ahn | |
| 2020/0343607 A1 | 10/2020 | Kim et al. | |
| 2020/0381694 A1* | 12/2020 | Rath | H01M 10/653 |
| 2020/0388805 A1* | 12/2020 | Yoo | H01M 10/6567 |
| 2020/0395643 A1 | 12/2020 | Seo et al. | |
| 2021/0013460 A1* | 1/2021 | Ootsuki | B32B 27/285 |
| 2021/0313637 A1* | 10/2021 | Yamashiro | H01M 50/293 |
| 2021/0328291 A1* | 10/2021 | Nishikawa | H01M 10/0525 |
| 2021/0344074 A1* | 11/2021 | Jung | H01M 50/593 |
| 2022/0037715 A1* | 2/2022 | Kim | H01M 50/211 |
| 2022/0149478 A1* | 5/2022 | Egashira | H01M 50/262 |
| 2022/0158284 A1* | 5/2022 | Lee | H01M 10/0481 |
| 2022/0328905 A1* | 10/2022 | Park | H01M 50/271 |
| 2022/0343499 A1* | 10/2022 | Yousfi | G16H 30/40 |
| 2022/0407139 A1* | 12/2022 | Kim | H01M 10/653 |
| 2022/0416344 A1* | 12/2022 | Jeon | H01M 50/229 |
| 2023/0238608 A1* | 7/2023 | Kim | H01M 10/613 |
| | | | 429/120 |
| 2023/0249017 A1* | 8/2023 | Kim | A62C 3/16 |
| | | | 429/120 |
| 2023/0402703 A1* | 12/2023 | Kim | H01M 50/358 |
| 2024/0356102 A1* | 10/2024 | Kim | H01M 10/6555 |
| 2025/0030082 A1* | 1/2025 | Kim | H01M 10/653 |

FOREIGN PATENT DOCUMENTS

| | | |
|---|---|---|
| CN | 107431147 A | 12/2017 |
| CN | 108780934 A | 11/2018 |
| CN | 109193019 A | 1/2019 |
| CN | 109449347 A | 3/2019 |
| EP | 3264492 A1 | 1/2018 |
| EP | 3686987 A1 | 7/2020 |
| EP | 3796462 A1 | 3/2021 |
| JP | 2010277863 A | 12/2010 |
| JP | 2013012441 A | 1/2013 |
| JP | 2018510463 A | 4/2018 |
| JP | 2019096387 A | 6/2019 |
| JP | 2019515480 A | 6/2019 |
| KR | 20130004141 A | 1/2013 |
| KR | 20170107798 A | 9/2017 |
| KR | 20180005456 A | 1/2018 |
| KR | 20180047383 A | 5/2018 |
| KR | 20190139620 A | 12/2019 |
| KR | 20200004202 A | 1/2020 |
| WO | 2019088625 A1 | 5/2019 |

OTHER PUBLICATIONS

International Search Report for PCT/KR2021/000350 dated Apr. 30, 2021. 3 pgs.

* cited by examiner

[FIG. 1]
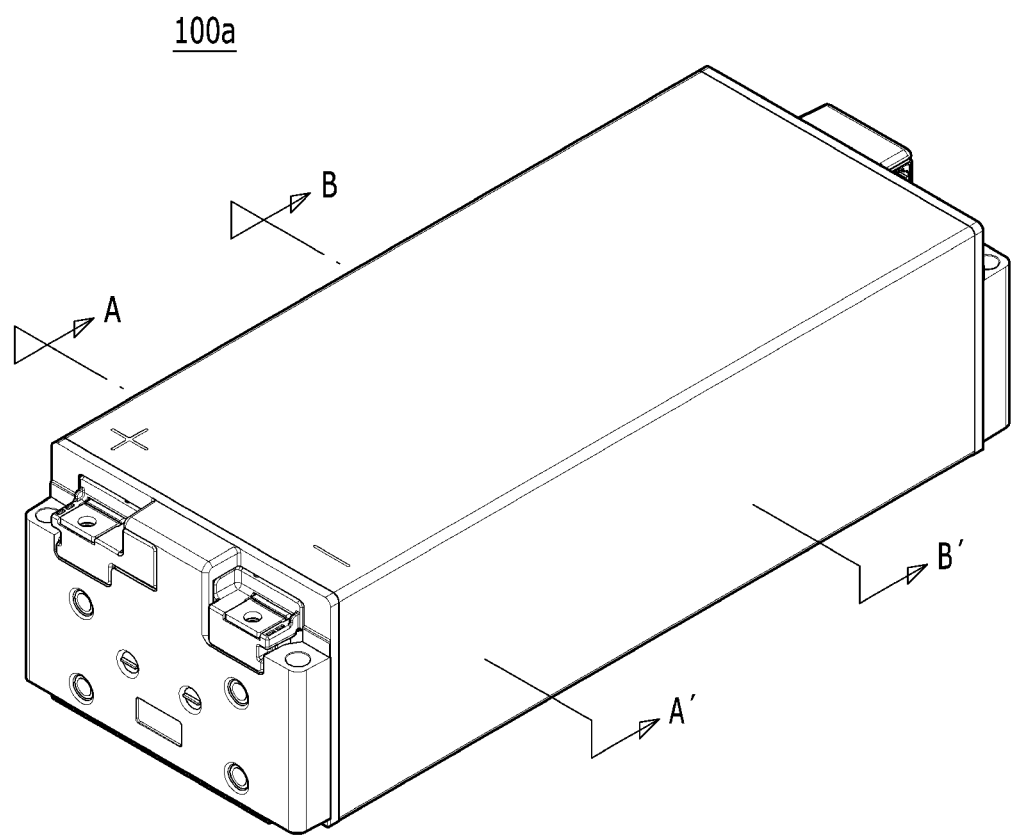

[FIG. 2]
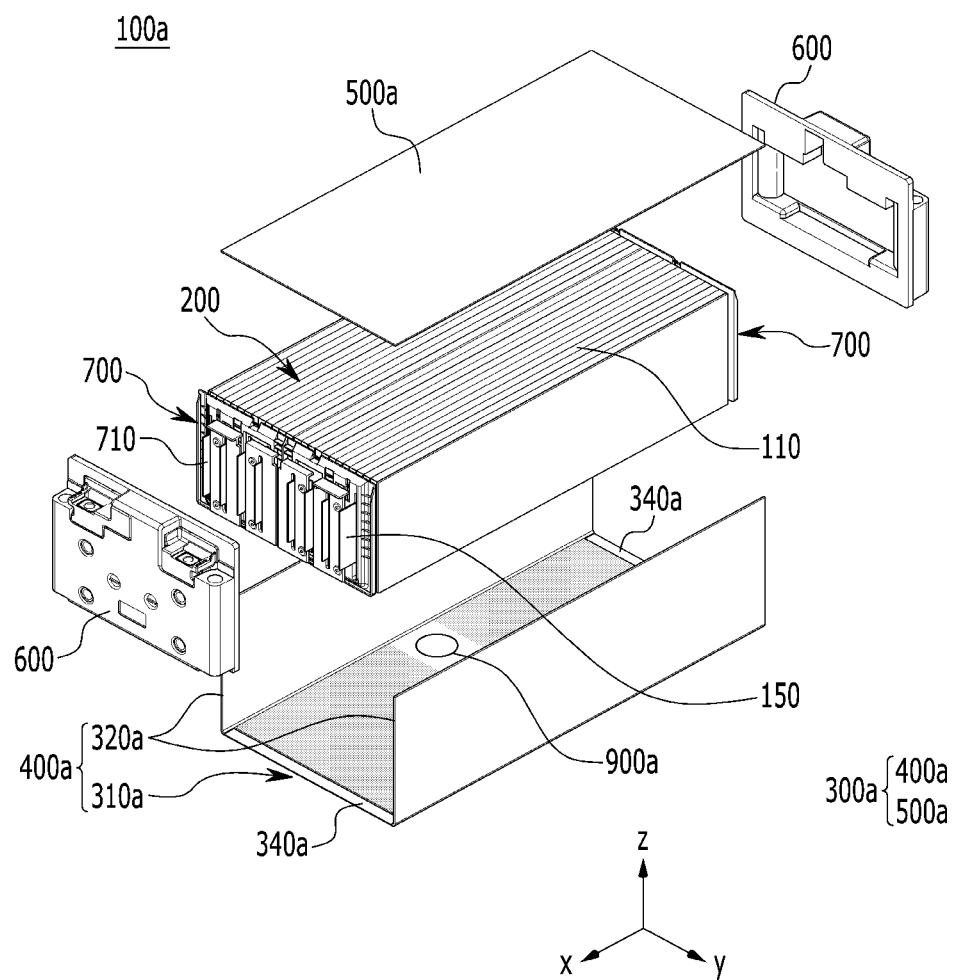

[FIG. 3]
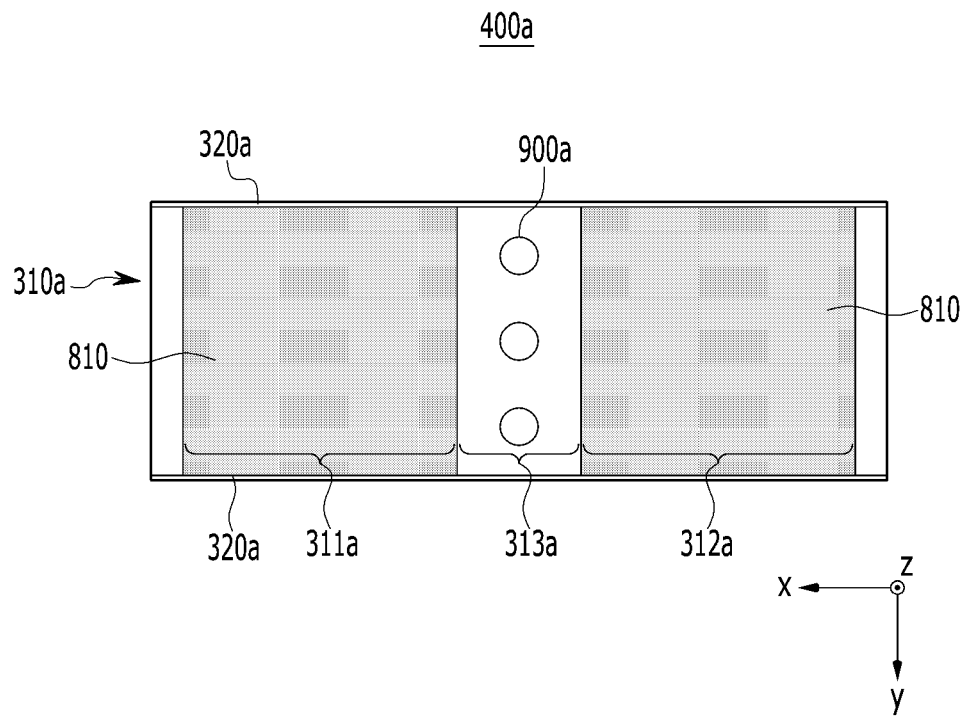
[FIG. 4]
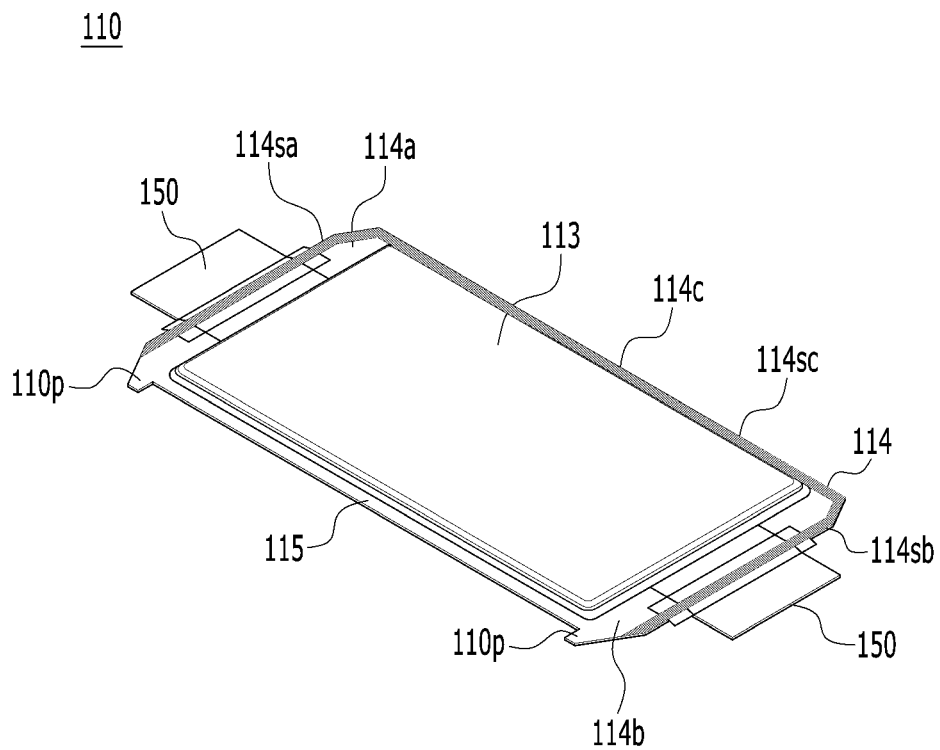

[FIG. 5]
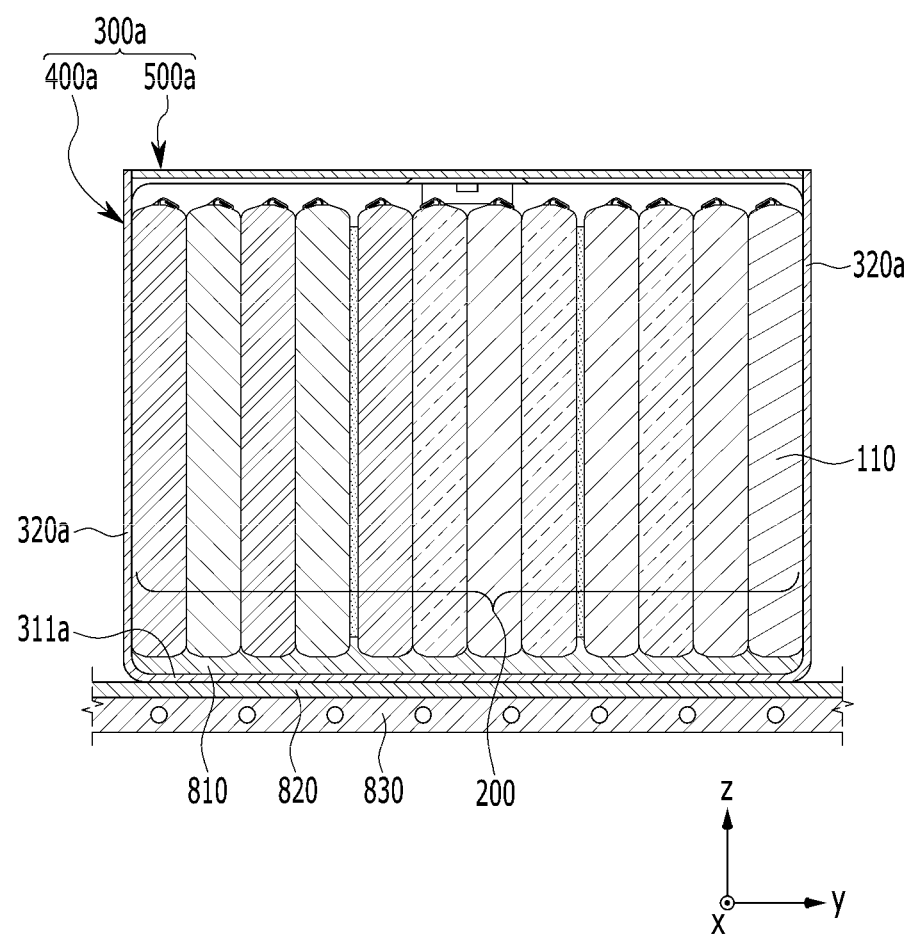

[FIG. 6]
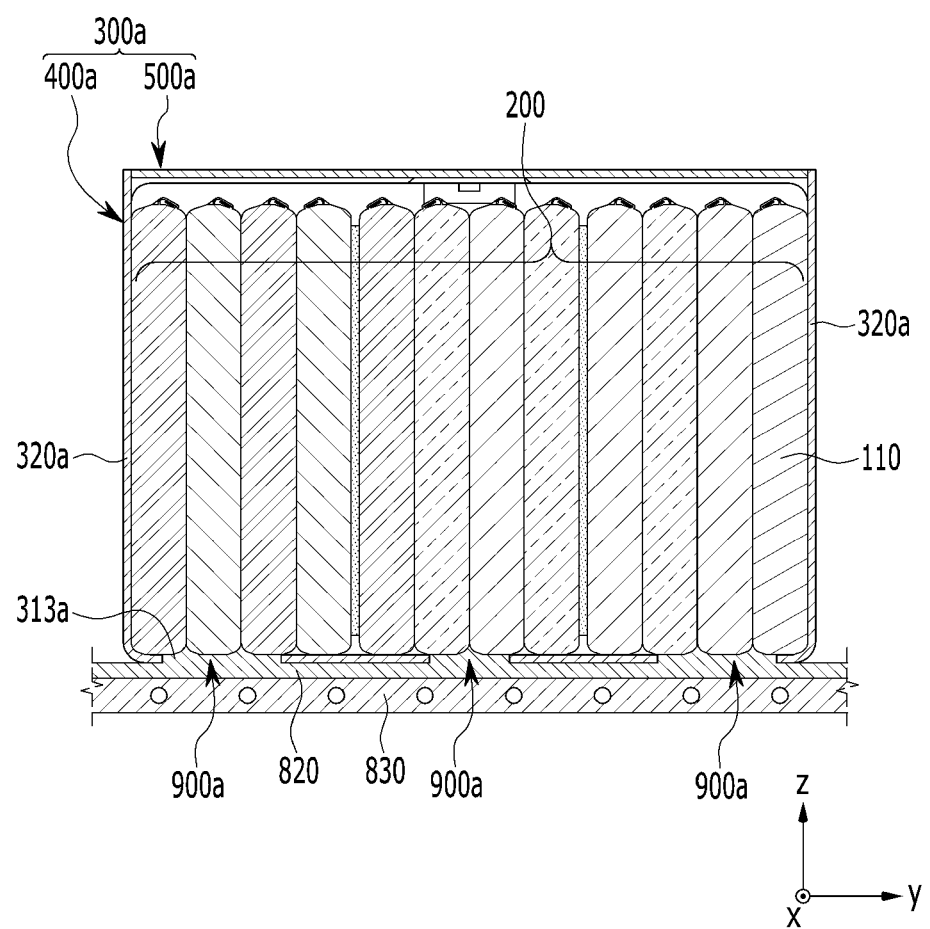

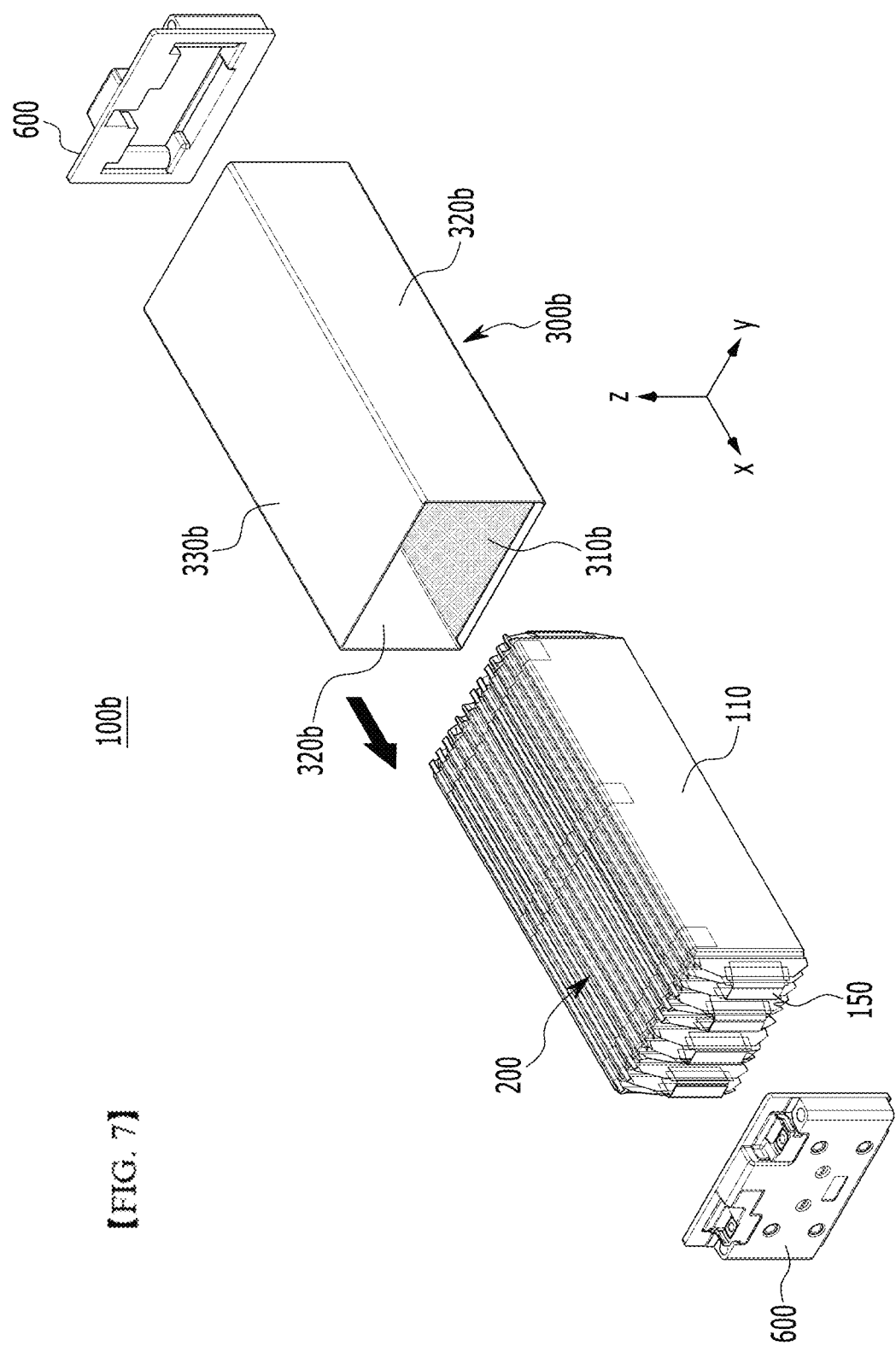
[FIG. 7]

[FIG. 8]
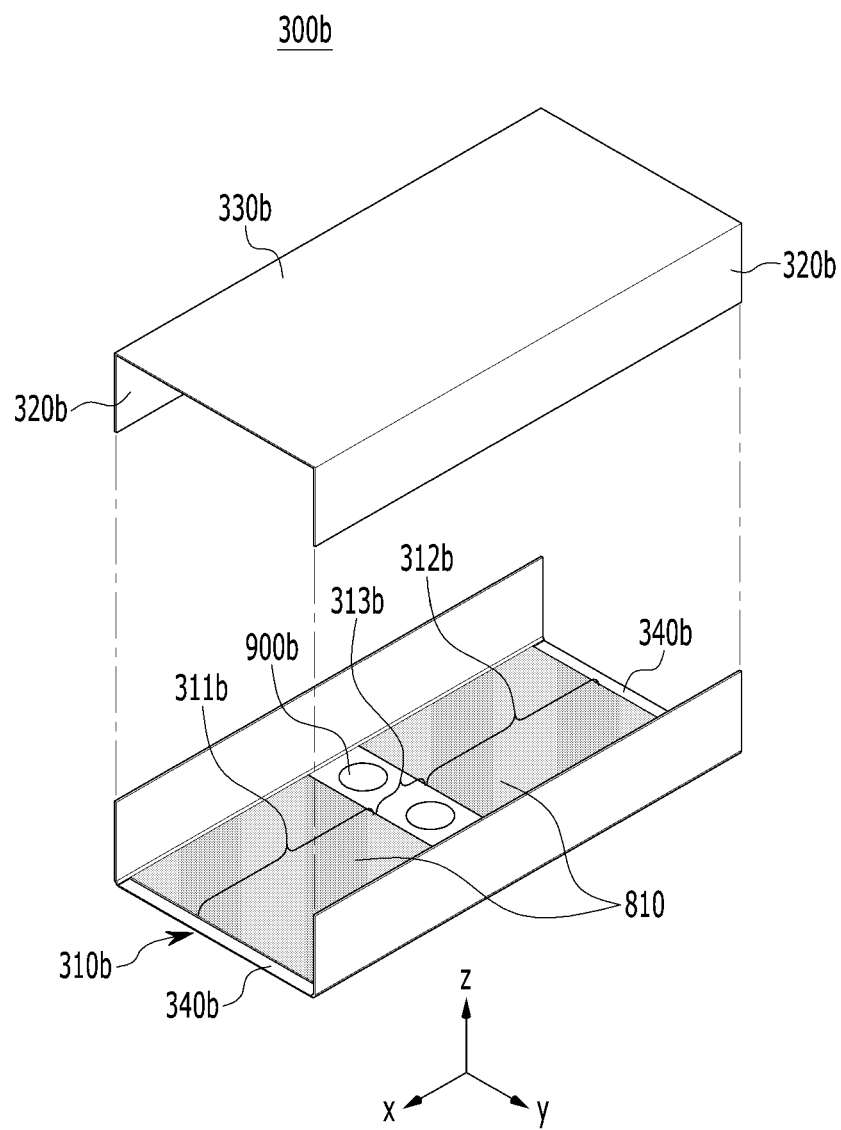

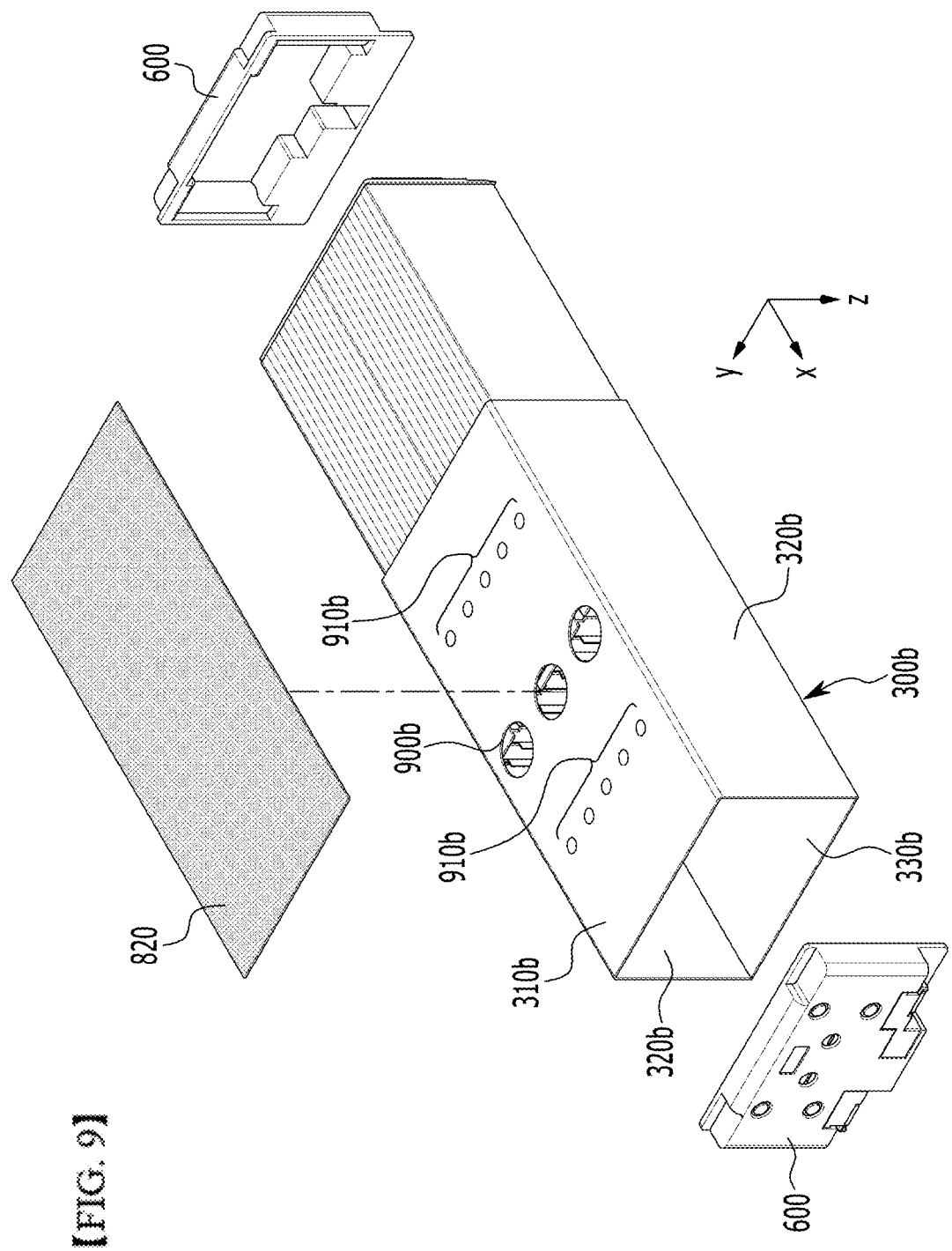
[FIG. 9]

BATTERY MODULE AND BATTERY PACK INCLUDING THE SAME

CROSS REFERENCE TO RELATED APPLICATIONS

The present application is a national phase entry under 35 U.S.C. § 371 of International Application No. PCT/KR2021/000350 filed on Jan. 11, 2021 which claims the benefit of Korean Patent Application No. 10-2020-0006113 filed on Jan. 16, 2020 with the Korean Intellectual Property Office, the disclosure of which is incorporated herein by reference in its entirety.

TECHNICAL FIELD

The present disclosure relates to a battery module and a battery pack including the same, and more particularly, to a battery module having improved cooling performance, and a battery pack including the same.

BACKGROUND ART

In modern society, as portable devices such as a mobile phone, a notebook computer, a camcorder and a digital camera have been used daily, the development of technologies in the fields related to mobile devices as described above has been increased. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, and a lithium secondary battery. Among them, the lithium secondary battery has come into the spotlight because it has advantages, for example, hardly exhibiting memory effects compared to nickel-based secondary batteries and thus being freely charged and discharged, and having very low self-discharge rate and high energy density.

Such lithium secondary batteries mainly use a lithium-based oxide and a carbonaceous material as a positive electrode active material and a negative electrode active material, respectively. The lithium secondary battery includes an electrode assembly in which a positive electrode plate and a negative electrode plate respectively coated with the positive electrode active material and the negative electrode active material are disposed with a separator being interposed between them, and a battery case which seals and houses the electrode assembly together with an electrolyte solution.

Generally, the lithium secondary battery may be classified based on the shape of the exterior material into a can type secondary battery in which the electrode assembly is built in a metal can, and a pouch-type secondary battery in which the electrode assembly is built in in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or parallel to form a cell stack, thereby improving capacity and output. In addition, one or more battery modules can be mounted together with various control and protection systems such as a battery management system (BMS) and a cooling system to form a battery pack.

Meanwhile, in order to protect the battery cell stack from external impact, heat or vibration, the battery module may include a module frame for housing the battery cell stack in an internal space, and an end plate.

At this time, a thermal conductive resin can be injected between the battery cell stack and the module frame to form the thermal conductive resin layer, and the thermal conductive resin layer can perform a role of transferring heat generated in the battery cell stack to the bottom of the battery module.

However, when the thermal conductive resin is injected in an excessive amount, there is a problem that the manufacturing cost of the battery module increases, which adversely affects the profitability.

DETAILED DESCRIPTION OF THE INVENTION

Technical Problem

An object of the embodiments of the present disclosure is to provide a battery module capable of keeping the temperature between battery cells uniform while achieving the optimum coating amount of a thermal conductive resin that forms a thermal conductive resin layer, and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked, a module frame for housing the battery cell stack, and a first thermal conductive resin layer located between the battery cell stack and a bottom or a first portion of the module frame, wherein the bottom portion includes a first region, a second region and a third region, the third region is located between the first region and the second region, which are separated from each other, a first thermal conductive resin layer is formed on the first region and the second region, and at least one through hole is formed in the third region.

The battery module may further include a second thermal conductive resin layer located under the bottom portion.

The battery cell stack may come into contact with the second thermal conductive resin layer through the through hole.

The battery may further include a heat sink located under the second thermal conductive resin layer.

The first region and the second region may be located at both ends separated from each other in the bottom portion, and the third region may be located between the first region and the second region.

The module frame has an opened front surface and an opened rear surface, and the first region and the second region may be located so as to be separated from each other at both ends of the bottom portion adjacent to the front surface and the rear surface, respectively.

The battery cell includes electrode leads, and the electrode leads may protrude toward the opened front surface and the opened rear surface of the module frame.

The module frame may include a U-shaped frame having an opened upper surface, and an upper plate configured to cover the opened upper surface of the U-shaped frame.

The module frame may be a mono frame in which the bottom portion, two side portions, and a ceiling portion are integrated.

The bottom portion may include two or more injection holes located in the first region and the second region, respectively.

At least one of the first thermal conductive resin layer and the second thermal conductive resin layer includes a thermal conductive resin, and the thermal conductive resin may include at least one of a silicone material, a urethane material, and an acrylic material.

Advantageous Effects

According to the embodiments of the present disclosure, through at least one through-hole formed in the bottom portion of the module frame, the optimum amount of the thermal conductive resin coated onto the bottom portion can be achieved, and at the same time, the temperature between battery cells included in the battery module uniform can be kept uniform.

BRIEF DESCRIPTION OF THE DRAWINGS

FIG. 1 is a perspective view of a battery module according to an embodiment of the present disclosure.

FIG. 2 is an exploded perspective view of the battery module of FIG. 1.

FIG. 3 is a plan view of the U-shaped frame included in the battery module of FIG. 2 as viewed from above.

FIG. 4 is a perspective view of a battery cell included in the battery module of FIG. 2.

FIG. 5 is a cross-sectional view taken along the cutting line A-A' of FIG. 1.

FIG. 6 is a cross-sectional view taken along the cutting line B-B' of FIG. 1.

FIG. 7 is an exploded perspective view of a battery module according to another embodiment of the present disclosure.

FIG. 8 is a perspective view illustrating a mono frame included in the battery module of FIG. 7.

FIG. 9 is a perspective view showing a state in which the battery module of FIG. 7 is turned upside down.

DETAILED DESCRIPTION

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the figures. In the figures, the thickness of layers, regions, etc. are exaggerated for clarity. In the figures, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

FIG. 1 is a perspective view of a battery module according to an embodiment of the present disclosure. FIG. 2 is an exploded perspective view of the battery module of FIG. 1. FIG. 3 is a plan view of the U-shaped frame included in the battery module of FIG. 2 as viewed from above.

Referring to FIGS. 1 to 3, a battery module 100a according to an embodiment of the present disclosure includes a battery cell stack 200 in which a plurality of battery cells 110 are stacked, a module frame 300a for housing the battery cell stack 200, and a first thermal conductive resin layer 810 located between the battery cell stack 200 and the bottom portion (a first portion) of the module frame 300a. In this case, the bottom portion 310a includes a first region 311a, a second region 312a and a third region 313a, and the third region 313a is located between the first region 311a and the second region 312a which are separated from each other. Further, the first thermal conductive resin layer 810 is formed on the first region 311a and the second region 312a, and at least one through hole 900a is formed in the third region 313a.

The module frame 300a may have a shape in which a front surface (x-axis direction) and a rear surface (opposite direction along the x-axis) are opened, and an end plate 600 may cover the opened front surface and the opened rear surface of the module frame 300a, respectively. The module frame 300a and the end plate 600 preferably have a predetermined strength in order to protect other electrical components including the battery cell stack 200 from external impact, and for this purpose, it may include a metal material, particularly aluminum.

Meanwhile, the module frame 300a according to this embodiment includes a U-shaped frame 400a having an opened upper surface (z-axis direction) and an upper plate 500a configured to cover the opened upper surface of the U-shaped frame 400a. The U-shaped frame 400a and the upper plate 500a may be joined to each other by welding, but the joining method is not limited thereto, and may be implemented through various embodiments.

The U-shaped frame 400a may include a bottom portion 310a and two side portions 320a extending in the upper direction (Z-axis direction) from both sides of the bottom portion 310a opposite to each other, and the distance between the two side portions 320a is preferably approximately equal to the width of the upper plate 500a.

In this embodiment, the bottom portion 310a of the module frame 300a corresponds to the bottom portion 310a of the U-shaped frame 400*a*, and the bottom portion 310*a* includes a third region 313*a* in which at least one through hole 900*a* is formed, and a first region 311*a* and a second region 312*a* in which the first thermal conductive resin layer 810 is formed.

The first thermal conductive resin layer 810 located in the first region 311*a* and the second region 312*a* is formed by coating a thermal conductive resin onto the bottom portion 310*a*, and the thermal conductive resin may include a thermal conductive adhesive material. For example, it may include at least one of a silicone material, a urethane material, and an acrylic material.

The thermal conductive resin is liquid during coating, but is solidified after coating, thereby being able to perform a role of fixing one or more battery cells 110 constituting the battery cell stack 200. In addition, the thermal conductive resin has excellent thermal conductivity, so that the heat generated in the battery cell 110 can be quickly transferred to the lower surface of the battery module 100*a* to prevent overheating of the battery module 100*a*.

Meanwhile, the state of the battery cell 110 included in the battery cell stack 200 is shown in FIG. 4. FIG. 4 is a perspective view of the battery cell 110 included in the battery module of FIG. 2.

Referring to FIG. 4, the battery cell 110 is preferably a pouch-type battery cell. For example, the battery cell 110 according to the present embodiment has a structure in which two electrode leads 150 face each other and protrude from one end 114*a* and the other end 114*b* of the battery body 113, respectively. More specifically, the electrode leads 150 are connected to the electrode assembly (not shown) and protrude from the electrode assembly (not shown) to the outside of the battery cell 110.

Meanwhile, the battery cell 110 can be manufactured by adhering both ends 114*a* and 114*b* of the battery case 114 and one side portion 114*c*, connecting them in a state where an electrode assembly (not shown) is housed in a battery case 114. In other words, the battery cell 110 according to this embodiment has a total of three sealing portions 114*sa*, 114*sb*, 114*sc*, the sealing portions 114*sa*, 114*sb*, 114*sc* have a structure that is sealed by a method such as thermal fusion, and the remaining other side portion may be formed of a connection portion 115. In addition, the connection portion 115 may extend along one edge of the battery cell 110, and a protrusion portion 110*p* of the battery cell 110 called a bat-ear may be formed at an edge of the connection portion 115.

Referring back to FIG. 2, the battery cells 110 of FIG. 4 may be stacked along the y-axis direction to form a battery cell stack 200. Accordingly, electrode leads 150 of the plurality of battery cells 110 may protrude toward the front surface (x-axis direction) and the rear surface (opposite direction to the x-axis), respectively.

Meanwhile, the first region 311*a* and the second region 312*a* are located at both ends separated from each other in the bottom portion 310*a*, and the third region 313*a* may be located between the first region 311*a* and the second region 312*a*. That is, the first thermal conductive resin layer 810 may be located at both ends separated from each other in the bottom portion 310*a*.

More specifically, in the module frame 300*a* of which the front surface (x-axis direction) and the rear surface (opposite direction to the x-axis) are opened, the first region 311*a* and the second region 312*a* in which the first thermal conductive resin layer 810 is formed may be located so as to be separated from each other at both ends of the bottom portion 310*a* adjacent to each of the front surface and the rear surface.

According to this embodiment, as shown in FIG. 2, the battery cell stack 200 may be located on the bottom portion 310*a* along the direction (opposite direction to the z-axis) vertically descending through the opened upper surface of the U-shaped frame 400*a*. Prior to locating the battery cell stack 200, a thermal conductive resin can be coated onto the bottom portion 310*a* to form a first thermal conductive resin layer 810, and the thermal conductive resin is compressed by the vertically descending battery cell stack 200 and moves in the horizontal direction. At this time, if the thermal conductive resin is coated onto all regions of the bottom portion 310*a*, and due to the battery cell stack 200 descending vertically, the thermal conductive resin may overflow to the outside of the module frame 300*a*. However, when only a small amount of the thermal conductive resin is coated, there is a fear that the heat transfer performance of the thermal conductive resin layer is decreased.

Thus, the battery module 100*a* according to the present embodiment is configured such that when one battery module 100*a* is manufactured by forming the first thermal conductive resin layer 810 in the first region 311*a* and the second region 312*a* only, and then locating the battery cell stack 200 thereon, it is possible to prevent the decrease of heat transfer performance from occurring through the first thermal conductive resin layer 810, simultaneously while preventing the use of excess heat conductive resin.

As described above, the electrode leads 150 of the battery cells 110 may protrude toward the front surface (x-axis direction) and the rear surface (opposite direction along the x-axis) of the module frame 300*a*, respectively. When the battery module 100*a* operates, the portion of the electrode leads 150 among the battery cells 110 may generate more heat than other portions, whereby the battery cell stack 200 can concentrate heat in the portion adjacent to each of the front surface (x-axis direction) and the rear surface (opposite direction along the x-axis).

At this time, the first region 311*a* and the second region 312*a* in which the first thermal conductive resin layer 810 is formed are located so as to be separated from each other at both ends of the bottom portion 310*a* adjacent to each of the front surface and the rear surface, so that heat concentrated in the portion adjacent to each of the front surface and the rear surface may be more rapidly discharged. In other words, the temperature can be kept uniform at each point of the battery cell 110, thereby preventing a decrease in performance of the battery cell 110 due to the temperature deviation.

However, since the thermal conductive resin layer is not formed in the third region 313*a*, a temperature deviation of the battery cell 110 may occur due to this. Thus, the battery module 100*a* according to the present embodiment attempted to solve these problems by providing at least one through hole 900*a* in the third region 313*a*. Hereinafter, it will be described in detail together with FIGS. 5 and 6.

FIG. 5 is a cross-sectional view taken along the cutting line A-A' of FIG. 1, and FIG. 6 is a cross-sectional view taken along the cutting line B-B' of FIG. 1. Specifically, the cutting line A-A' passes through the first region 311*a*, and the cutting line B-B' passes through the third region 313*a*.

Referring to FIGS. 5 and 6, the battery module 100*a* according to the present embodiment may include a second thermal conductive resin layer 820 located under the bottom portion 310*a* of the module frame 300*a*. The second thermal conductive resin layer 820 may include a thermal conductive resin containing a thermal conductive adhesive material, similarly to the first thermal conductive resin layer 810.

Meanwhile, the battery module 100a may further include a heat sink 830 located under the second thermal conductive resin layer 820. The heat sink 830 may include a refrigerant flow passage formed therein, and may perform a function of discharging heat generated in the battery cell stack 200 to the outside.

Thus, as shown in FIG. 5, the heat generated in the portion corresponding to the first region 311a of the battery cell 110 may sequentially move to the outside along a first thermal conductive resin layer 810, a first region 311a of the bottom portion 310a, a second thermal conductive resin layer 820 and a heat sink 830. In this case, the heat transfer path in the portion corresponding to the second region 312a is similar to the heat transfer path in the portion corresponding to the first region 311a described above.

On the other hand, in the third region 313a in which the thermal conductive resin layer is not formed between the battery cell stack 200 and the bottom portion 310a, there is a possibility that the cooling performance may be decreased due to an empty space without the thermal conductive resin layer. Thus, in this embodiment, as shown in FIG. 6, at least one through hole 900a is formed in the third region 313a, and the battery cell stack 200 may come into contact with a second thermal conductive resin layer 820 through a through hole 900a. Accordingly, the heat generated in the portion of the battery cell 110 corresponding to the third region 313a may sequentially move to the outside along a second thermal conductive resin layer 820 and a heat sink 830.

Furthermore, even when the through hole 900a is formed, a portion in which the battery cell 110 and the second thermal conductive resin layer 820 are not in contact with each other may be formed in the third region 313a. However, since the third region 313a corresponds to the middle portion of the battery cell 110 that generates relatively little heat compared to the portion of the electrode leads 150, these configurations may be more suitable for uniformly keeping the overall temperature of the battery cell 110.

Meanwhile, the through hole 900a according to the embodiments of the present disclosure may be formed of one hole or two or more holes, but as shown in FIGS. 2 and 3, it is preferable that a plurality of through-holes are formed and located so as to be separated from each other along the stacking direction (y-axis direction) of the battery cells 110.

Further, although only the shape of a circular through-hole 900a is illustrated, the through-hole 900a according to the embodiments of the present disclosure may have a polygonal shape as well as a circular shape.

Hereinafter, a battery module 100b according to another embodiment of the present disclosure will be described with reference to FIGS. 7 to 9.

FIG. 7 is an exploded perspective view of a battery module according to another embodiment of the present disclosure. FIG. 8 is a perspective view illustrating a mono frame included in the battery module of FIG. 7. FIG. 9 is a perspective view showing a state in which the battery module of FIG. 7 is turned upside down.

The battery module 100b according to the present embodiment includes a battery cell stack 200 in which a plurality of battery cells 110 are stacked, a module frame 300b and a first thermal conductive resin layer 810. Further, the battery module 100b may further include an end plate 600 and a second thermal conductive resin layer 820 located under the bottom portion 310b of the module frame 300b. At this time, the battery cell stack 200, the first thermal conductive resin layer 810, the second thermal conductive resin layer 820, and the end plate 600 overlap with the contents described above, and thus, a detailed description thereof is omitted.

The module frame 300b according to the present embodiment may be a mono frame in which the upper surface (z-axis direction), the lower surface (opposite direction along the z-axis) and both surfaces (y-axis direction and opposite direction along the y-axis) are integrated. In other words, the module frame 300b, which is a mono frame, may include a bottom portion 310b, two side portions 320b and a ceiling portion 330b, and the bottom portion 310b, the two side portions 320b and the ceiling portion 330b may be integrated. FIG. 8 shows a state in which two side portions 320b are cut for convenience of explanation only.

The front surface (x-axis direction) and the back surface (opposite direction along the x-axis) of the module frame 300b are opened, and the battery cell stack can be housed through the opened front surface or the opened back surface.

The bottom portion 310b of the module frame 300b includes a first region 311b, a second region 312b and a third region 313b, and the third region 313b is located between the first region 311b and the second region 312b which are separated from each other. A first thermal conductive resin layer 810 is formed on the first region 311b and the second region 312b, and at least one through hole 900b is formed in the third region 313b.

The first region 311b and the second region 312b are located at both ends separated from each other in the bottom portion 310b, and the third region 313b may be located between the first region 311b and the second region 312b. That is, the first thermal conductive resin layer 810 may be located at both ends separated from each other in the bottom portion 310b. More specifically, in the module frame 300b in which the front surface (x-axis direction) and the rear surface (opposite direction along the x-axis) are opened, the first region 311b and the second region 312b in which the first thermal conductive resin layer 810 is formed may be located so as to be separated from each other at both ends of the bottom portion 310b adjacent to the front surface and the rear surface, respectively.

Meanwhile, at least one through hole 900b is formed in the third region 313b, and the battery cell stack 200 may come into contact with the second thermal conductive resin layer 820 through the through hole 900b.

Referring to FIG. 9, the bottom portion 310b of the module frame 300b according to the present embodiment may include two or more injection holes 910b located in the first region 311b and the second region 312b, respectively.

Due to the structure of the module frame 300b, which is a mono frame in which the bottom portion 310b, two side portions 320b and the ceiling part 330b are integrated, the battery cell stack 200 has to be housed through the opened front surface (x-axis direction) or the opened rear surface (opposite direction along the x-axis), and it is desirable that the thermal conductive resin is not coated in advance before housing the battery cell stack 200.

Instead, after housing the battery cell stack 200, a thermal conductive resin can be injected through two or more injection holes 910b to form a first thermal conductive resin layer 810 in the first region 311b and the second region 312b.

Although the number of the injection holes 910b is not particularly limited, it is preferable that a plurality of the injection holes 910b are formed in the first region 311b and the second region 312b.

Meanwhile, referring to FIGS. 2 and 8, in the first regions 311a and 311b and the second regions 312a and 312b, recessed grooves 340a and 340b may be formed in a state where a thermal conductive resin is not coated, so that the protrusion portion 110*p* of the battery cell 110 shown in FIG. 4 can be mounted.

Referring to FIG. 2, the battery module 100*a* according to the embodiments of the present disclosure may further include a bus bar 710 connecting the electrode leads 150 of each battery cell 110 and a bus bar frame 700 on which the bus bar 710 is mounted.

Specifically, the bus bar frame 700 may be formed on the front surface (x-axis direction) and the rear surface (opposite direction along the x-axis) of the battery cell stack 200 according to the protrusion directions of the electrode leads 150, respectively. The electrode leads 150 of the battery cells 110 may be bent after passing through a slit formed in the bus bar frame 700 so as to be connected to the bus bar 710. Since the end plate 600 is joined with the module frame 300*a*, various electrical components mounted on the bus bar frame 700 including the bus bar 710 can be protected from external impacts and the like.

The one or more battery modules according to the present embodiment described above can be mounted together with various control and protection systems such as a battery management system (BMS) and a cooling system to form a battery pack.

The above-mentioned battery module or the battery pack can be applied to various devices. Specifically, these devices may be applied to vehicle means such as an electric bicycle, an electric vehicle, a hybrid vehicle, but the present disclosure is not limited thereto and can be applied to various devices that can use the secondary battery.

Although the preferred embodiments of the present disclosure have been described in detail above, the scope of the present disclosure is not limited thereto, and various modifications and improvements made by those skilled in the art using the basic concepts of the present disclosure, which are defined in the appended claims, also belong to the scope of the present disclosure.

DESCRIPTION OF REFERENCE NUMERALS

100*a*, 100*b*: battery module
110: battery cell
200: battery cell stack
300*a*, 300*b*: module frame
310*a*. 310*b*: bottom portion
311*a*, 311*b*: first region
312*a*, 312*b*: second region
313*a*, 313*b*: third region
600: end plate
700: bus bar frame
710: bus bar
810: first thermal conductive resin layer
820: second thermal conductive resin layer
830: heat sink
900*a*, 900*b*: through hole

The invention claimed is:

1. A battery module comprising:
a battery cell stack in which a plurality of battery cells are stacked,
a module frame for housing the battery cell stack, and
a first thermal conductive resin layer located between the battery cell stack and a first portion of the module frame,
wherein the first portion comprises a first region, a second region and a third region,
the third region is located between the first region and the second region which are separated from each other,
the first thermal conductive resin layer is formed on the first region and the second region, and
at least one through-hole is formed in the third region;
wherein the first thermal conductive resin layer is not formed on the third region.

2. The battery module according to claim 1,
further comprising a second thermal conductive resin layer located on a second portion of the module frame, the second portion of the module frame opposing the first portion of the module frame.

3. The battery module according to claim 2, wherein:
the battery cell stack comes into contact with the second thermal conductive resin layer through the through hole.

4. The battery module according to claim 2,
further comprising a heat sink located adjacent the second thermal conductive resin layer.

5. The battery module according to claim 1, wherein:
the first region and the second region are located at both ends separated from each other in the first portion, and the third region is located between the first region and the second region.

6. The battery module according to claim 1, wherein:
the module frame has an opened first surface and an opened second surface opposite the first surface, and
the first region and the second region are located so as to be separated from each other at both ends of the first portion adjacent to the first surface and the second surface, respectively.

7. The battery module according to claim 6, wherein:
the battery cell comprises electrode leads, and
the electrode leads protrude toward the opened first surface and the opened second surface of the module frame.

8. The battery module according to claim 1, wherein:
the module frame comprises a U-shaped frame having a first side surface, a second side surface opposite the first side surface, and a lower surface connecting the first and second side surfaces, and an upper plate configured to be positioned opposite the lower surface along the first and second side surfaces of the U-shaped frame.

9. The battery module according to claim 1, wherein:
the module frame is a mono frame in which the first portion, two side portions, and a second portion opposite the first portion are integrated.

10. The battery module according to claim 9, wherein:
the first portion comprises two or more injection holes located in the first region and the second region, respectively.

11. The battery module according to claim 2, wherein:
at least one of the first thermal conductive resin layer and the second thermal conductive resin layer comprises a thermal conductive resin,
the thermal conductive resin comprises at least one of a silicone material, a urethane material, and an acrylic material.

12. A battery pack comprising one or more battery modules according to claim 1.

* * * * *